April 8, 1969     G. C. GAUNTT, JR., ET AL     3,436,921
APPARATUS AND METHOD OF PRODUCING SHAFTS AND CAISSONS
Filed June 15, 1966     Sheet 1 of 4
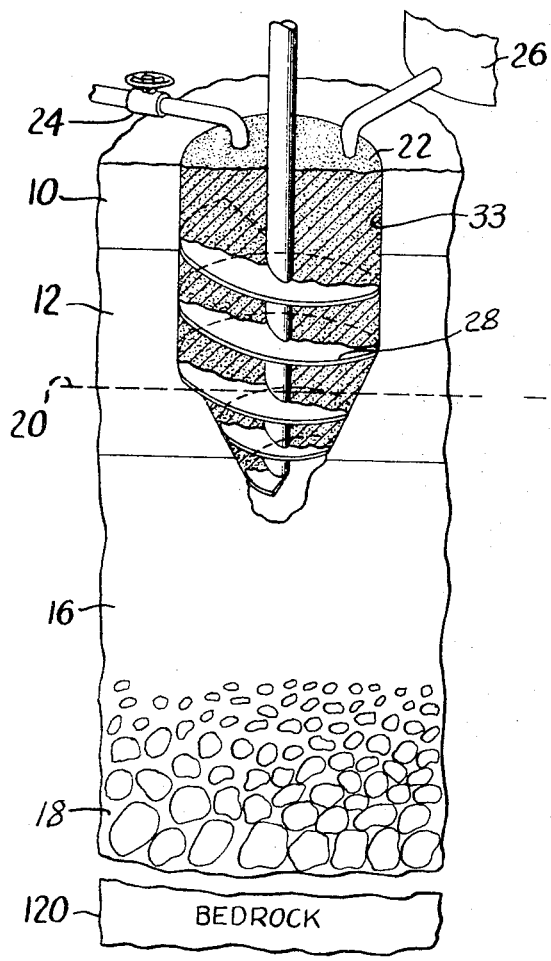
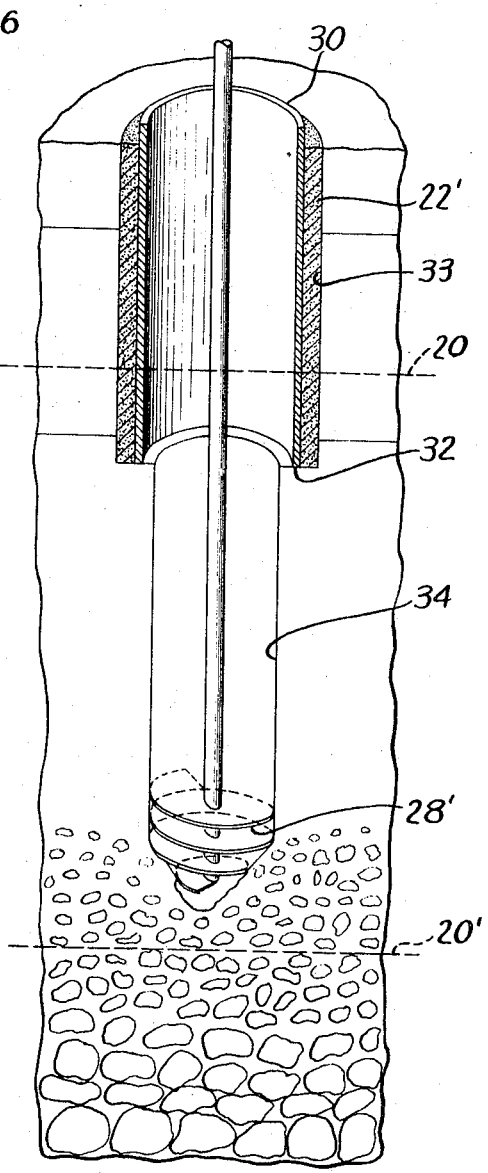
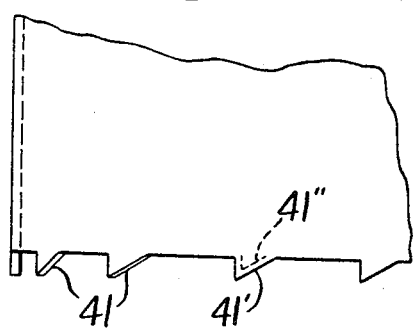
Inventors.
Grover C. Gauntt, Jr.
Robert G. Isaacs,
Robert L. Martin, &
James P. Walton.
By Petherbridge, O'Neill, & Aubel
Attys.

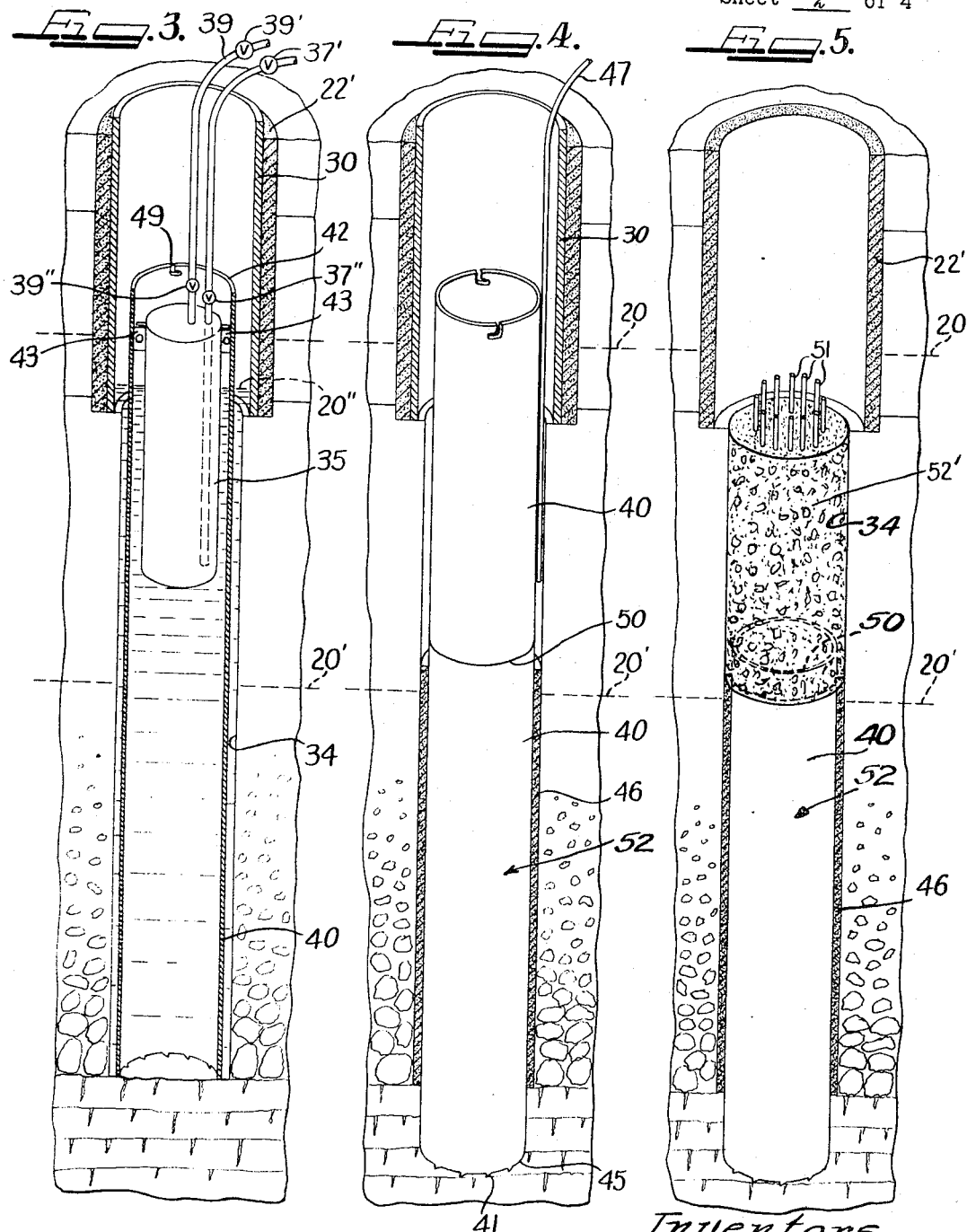

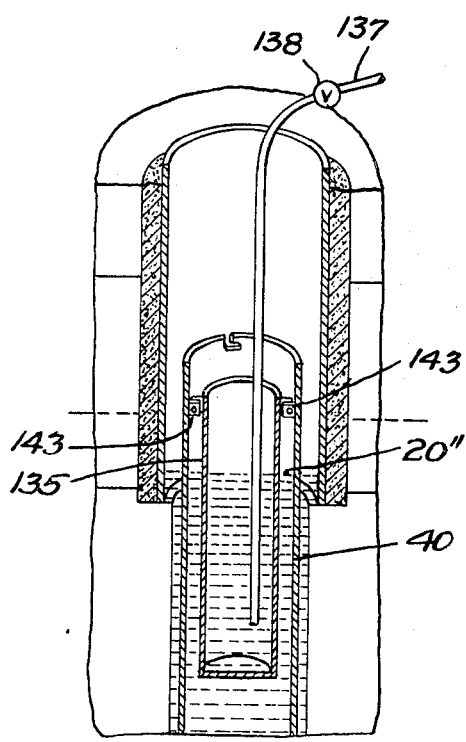
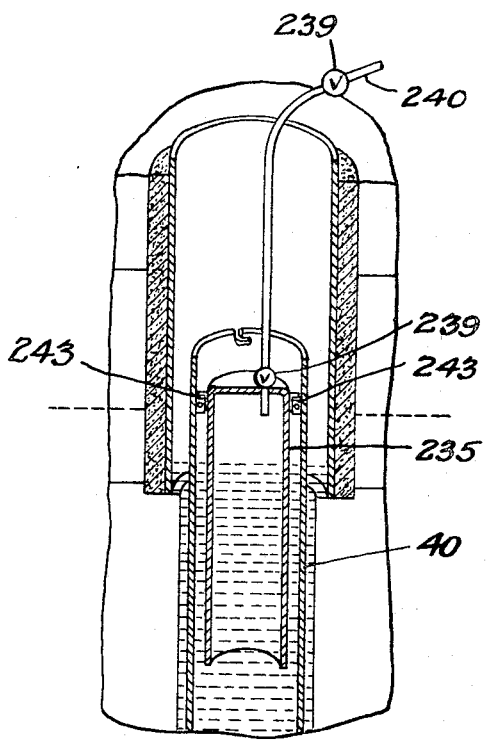

Fig. 9.
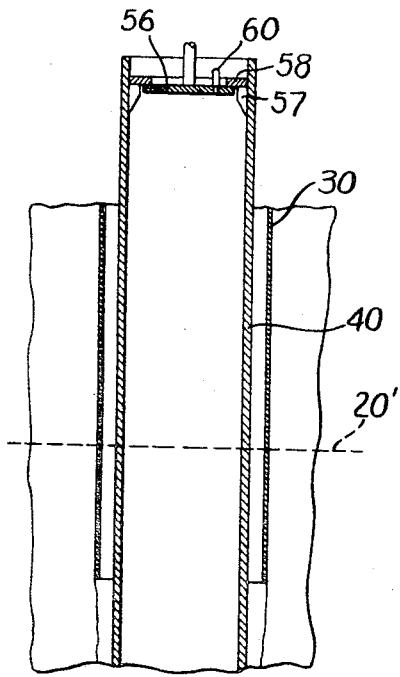
Fig. 10.
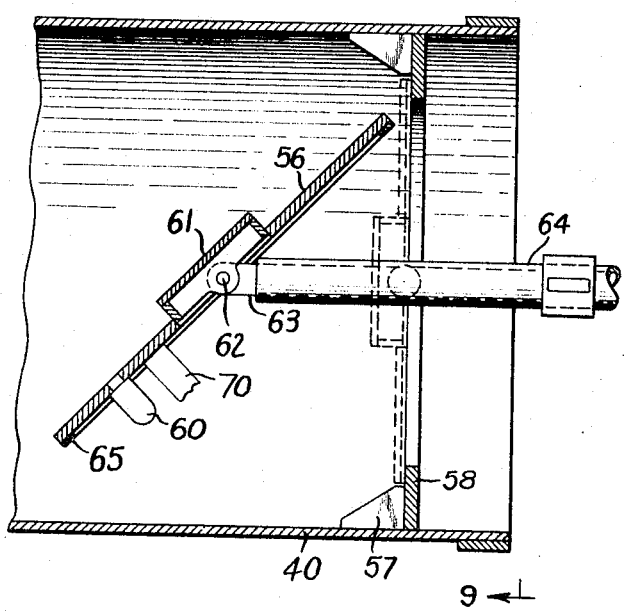
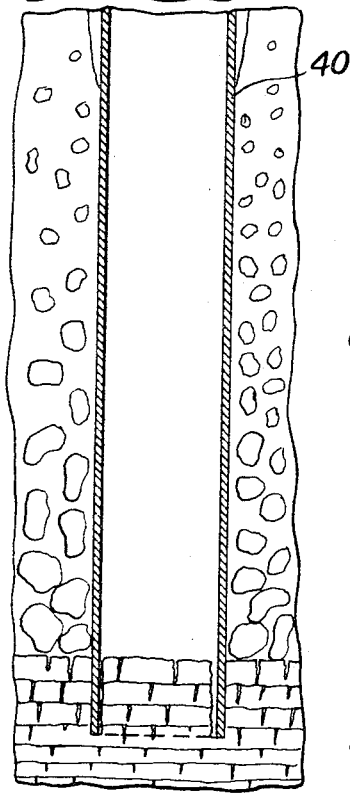
Fig. 11.
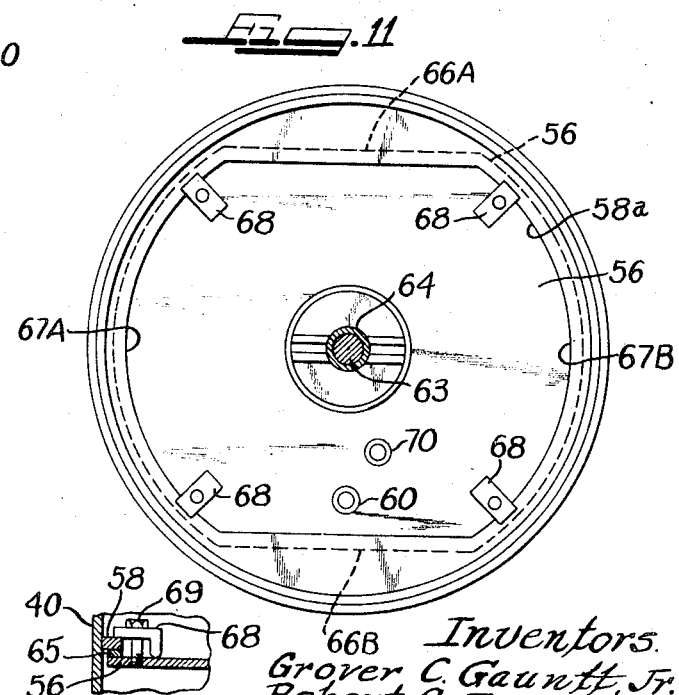
Fig. 11a.
Inventors.
Grover C. Gauntt, Jr.
Robert G. Isaacs.
Robert L. Martin, &
James P. Walton.
By Petherbridge, O'Neill, + Aubel,
Attys.

United States Patent Office 3,436,921
Patented Apr. 8, 1969

3,436,921
APPARATUS AND METHOD OF PRODUCING SHAFTS AND CAISSONS
Grover C. Gauntt, Jr., Itasca, Robert G. Isaacs, Oaklawn, Robert L. Martin, Chicago Heights, and James P. Walton, Bartlett, Ill., assignors to Case Foundation Company, Roselle, Ill., a corporation of California
Filed June 15, 1966, Ser. No. 557,806
Int. Cl. E21d *1/08;* E21b *33/03, 3/08*
U.S. Cl. 61—40      7 Claims

ABSTRACT OF THE DISCLOSURE

A method and apparatus for providing linings for hollow shafts in the production of caissons and foundations for structural supports. The method and apparatus are designed to facilitate the insertion and rotation of a core barrel in the earth in frictional contact with the substrate surface forming the base of the hollow shaft. This is accomplished by providing a buoying force on the core barrel to reduce the load on a rotating apparatus.

---

This invention relates to methods of producing shafts and caissons, and is a modification of the method described in Patent 3,100,381 issued Aug. 13, 1963, to S. E. Case et al. for "Methods of Producing Caissons," which patent is assigned to the same assignee as the present application.

In recent years, it has been found that improved foundations such as for buildings, bridges, docks, etc. are achieved by use of caissons which are concrete columns, reinforced if required, extending to suitable depths into the earth and which are securely supported by a load bearing stratum of material, preferably bedrock.

The method of producing caissons as disclosed in Patent 3,100,381 enables caissons to be used economically in granular soil and/or water bearing soil even with caissons having low cut-offs; that is, caissons having a top below the water table or below the surface of a granular material. Caissons constructed in accordance with the aforementioned method, under such adverse conditions, are less costly, less subject to defects due to caveins, produced with relatively economical equipment and require less time to produce than previously possible.

The method of producing caissons as disclosed in Patent 3,100,381 is very satisfactory for most operations. However, for certain projects, especially for larger buildings, bridges, docks, shafts, etc., it is necessary that relatively deeper or longer shafts be provided so that the caissons can rest on bedrock. The depth of the shafts which must be dug to form the caissons have increased such that shafts having a depth of 125 to 200 feet and a diameter of ten feet are now often demanded. In order to dig such deep shafts and pour the caissons, large, open-ended cylinders, commonly called core barrels, are inserted into the shaft to form a shield for the caisson. In some cases, the core barrel is left in place and serves as a part of the finished caisson. Further, in order to assure that a good support is provided between the caisson and the load bearing stratum, the core barrel is rotated or drilled into the load bearing stratum to penetrate the same.

Because of the increased depth of the caissons and their increased diameter, the length of the cylindrical forms, commonly called core barrels, used to form such caissons has increased a corresponding amount. Core barrels in the vicinity of 120 feet in length and eight feet in diameter have been used. Such core barrels, because of their large dimensions, must be of relatively thick steel plate, approximately ¾" to 1" in thickness; and, consequently, core barrels of the dimensions indicated weigh in the vicinity of 60 tons.

It has been found difficult for even the larger drilling rigs to handle and rotate a 60-ton, 120-foot-long core barrel to properly embed the core barrel in the load bearing bedrock or penetrate strata having boulders therein.

Accordingly, it is a principal object of the present invention to provide an improved method and apparatus for forming shafts or caissons in the earth which are to end or rest on relatively deeply situated load bearing strata.

It is another object of the present invention to provide an improved apparatus for providing caissons of relatively great depth.

It is another object of the invention to provide an improved method and apparatus for reducing the effective weight of the core barrel inserted into a shaft in which a caisson is to be formed.

It is another object of the present invention to provide an improved method and apparatus for controlling the effective weight of a core barrel.

It is yet another object of the present invention to provide a core barrel having improved cutting teeth on the lower end thereof for cutting into or embedding a core barrel into a rock.

It is another object of the present invention to provide a novel means and method for cleaning the teeth formed on the end of the core barrel by directing a flow of water through the teeth. Also, in a number of locations where shafts are being drilled, water sources are present at various levels in the earth's strata or formation. Heretofore, it has been the practice to attempt to perform the drilling operation in a relatively dry environment; hence, water sources are sealed off and water is removed from the shaft. Often, the "sealing-off" of the water sources becomes a considerable, expensive, time-consuming problem and is often unsatisfactory.

Accordingly, still another object of the present invention is to provide an improved means and method of drilling shafts wherein the shaft is dug in the presence of water and/or mud.

It is still another object of the present invention to provide an improved means and method of drilling shafts which means and method take advantage of the water and mud to aid the drilling of the shaft.

It is still a further object of the present invention to provide a new and improved method for providing caissons of improved strength and stability.

The method and apparatus of the invention are designed to facilitate the formation of and lining of hollow shafts in the earth wherein the shaft bottom is disposed at a considerable depth and the rotation of a core barrel into frictional engagement with a supporting substrate becomes difficult. By providing means for buoying the heavy-weight core barrel within a water-filled hollow shaft, the rotation of the heavy-weight core barrel in cutting relationship with the supporting subsurface can be accomplished without the use of substantially heavier equipment.

These and other objects and advantages will become more readily apparent from the following description and the accompanying drawings wherein like reference refer to like elements and in which:

FIG. 1 is an elevational view showing a typical cross section of the earth's surface and a column of suspended material;

FIG. 2 shows a structural casing lowered into place, and the suspended earth removed;

FIG. 3 shows a core barrel in the shaft and a flotation tank within the core barrel;

FIG. 4 shows the core barrel embedded in bedrock, the core barrel cut and concrete poured into the shaft;

FIG. 5 shows the core barrel and the structural casing removed and the caisson completed;

FIG. 6 is an enlarged view of the lower end of the core barrel to better indicate the teeth construction;

FIG. 7 shows a second embodiment of the flotation tank;

FIG. 8 shows another embodiment of the flotation tank;

FIG. 9 is a schematic diagram showing another embodiment of the invention comprising a core barrel having a cover plate and valve means useful in providing a buoyant force thereto;

FIG. 10 is an enlarged and more detailed view of the cover plate of FIG. 9;

FIG. 11 shows a plan view of the cover plate; and

FIG. 11a shows an enlarged view of the brackets for holding the cover plate in position.

Referring to FIG. 1, a cross-sectional view of the earth's surface is shown, and it should be appreciated that many variations in the stratum occur and the particular terrain of FIG. 1 is merely illustrative.

In FIG. 1, the surface layer which is usually quite thin is designated at 10 and generally comprises surface clay, black dirt, sand-fill and other materials. Below the surface layer is a stratum of granular material, such as sand and gravel and various mixtures of dirt, silt, sand, rocks, etc., hereinafter referred to as sand layer 12. An impervious soft-to-firm clay layer 16 is next encountered and this clay becomes more dense and impervious as the depth increases. Bedrock 120 is encountered below the clay. Water is frequently present in sand 12, and for purposes of illustration we have indicated the level of the surface water table by dotted line 20. Also, water sources may be found at various levels in the earth's formation which is indicated, for example, by dotted lines 20', designating the solid water level.

As an example only, in Chicago Ill., near Lake Michigan, the various layers may have the following depths: Surface layer 10, from 1 to 10 feet; sand layer 12, from 5 to 30 feet; clay layer 16, from 10 to 60 feet; and, hardpan 18, will extend down to bedrock at about 100 to 150 feet. The depth of the completed caissons of the type contemplated in one project in Chicago, Ill., area varied from 140 to about 190 feet to suitable bearing rock.

While the invention is of general applicability in drilling or forming shafts for any use, and particularly for forming shafts of considerable depth, the invention will be described herein in connection with a project for forming the foundation for the Hancock Center Building in Chicago.

When initiating a drilling operation in the aforementioned strata, it has been found that if an open excavation is made in sand layer 12, cave-in may occur. In addition, the presence of water in the sand will cause the excavation to fill with water and sand. Therefore, it may be desirable to provide a structural casing 30, see FIG. 2, to form the upper portion of the shaft. While sand 12 has no cohesion, it offers substantial resistance to driving a casing or any other member through the sand due to compaction of the sand and friction against the driven member. To overcome this problem and allow easy placement of a casing to form the upper portion of a shaft, the shaft is drilled and the top layer 10 and the sand layer 12 are placed in suspension.

In FIG. 1, a column of suspended material is generally designated 22. This column of suspended material is produced by mixing, stirring or agitating the material in the column of material 22 in which the auger or drill 28 is operating. Generally, the addition of water is required and hence a water source is indicated schematically at 24. While many methods can be used to agitate the earth, one convenient method is to use a conventional auger bit.

In order to produce the suspended column 22, auger bit 28 is placed in position and rotated to drill a shaft 33 while being longitudinally reciprocated. If sufficient water is present, this agitation produces a viscous mass with the solid particles such as sand being in suspension; that is, being trapped or held by clay and other earth in suspension in the water. If sufficient natural water is not present, additional water can be added from water source 24. In most soils, the addition of water and agitation will not produce sufficient suspension of the granular material. For example, in pure sand, a mixture will be created by agitation in the presence of water, but very rapid settlement of the sand follows when agitation stops and sufficient time is not available to allow placement of a structural casing. Under these conditions, a thixotropic product, such as bentonite and at times even common clay, is added to produce material that will remain in suspension for long periods of time and thus form a column of suspended material as at 22. Bentonite is the general term used to identify montmorillonite clays, acid treated natural or activated clays which have the property of being able to absorb large quantities of water and to swell and enlarge upon absorption. Moderate amounts of bentonite mixed with water and clay, or other earth, will produce a mass having the consistency of grease; and, smaller amounts of bentonite added to water and clay, or other earth, will produce a viscous slurry. While bentonite may be used, other clays that can be obtained directly on the site may also be satisfactory. In other cases, rock available at the site can be disintegrated and weathered to the characteristics of clay and can then be used in forming the column of suspended material.

The bentonite, or other thixotropic material, and water may either be added at the surface and worked downwardly into the soil by combined rotary and vertical movement of the bit; or the bentonite can be added below the surface by pumping it through the hollow core of a kelly to the bit. By these methods, columns up to 50 feet or more deep can be suspended within a short time. After the bentonite, or other thixotropic material, and water are completely mixed into layers 10 and 12 and the sand and other material are suspended in the slurry, drilling can be stopped for a considerable time before the sand will settle out of suspension. The column of suspended material will exert sufficient pressure against the earth strata surrounding said shaft to prevent the collapse of the strata material into the suspended material mixture, and this is enhanced by keeping the level of the mixture in the shaft quite high.

It is important, as will hereafter be explained, to extend the suspended column 22 a short distance, say about one or two feet, into impervious clay layer 16. The fact that the bit 28 has reached the impervious clay layer is evidenced by the presence of solid clay on bit 28 when it is surfaced.

The diameter of the column of suspended material 22 is greaetr than the diameter of the finished caisson and greater than the diameter of the structural casing, and this is, of course, controlled by selecting a proper size for bit 28. Usually, the diameter of the column of suspended material 22 is about one foot larger than the structural casing 30 allowing a six-inch clearance on each side of the casing.

While the method of the invention is being described herein with reference to one particular construction project, it should be clearly understood that the dimensions and depths recited herein are purely illustrative and are given for a better understanding of the invention; however, the invention is not to be limited to the dimensions and depths recited.

Casing 30 is lowered into the column of suspended material 22 from the top and, as metioned above, due to the viscous nature of the column of suspended material 22 there is no appreciable compaction of the earth below the bottom edge of the casing; and, in addition, no appreciable drag or frictional forces will be exerted by the slurry against the faces of casing 30. Thus, only relatively small force such as provided by the "crowd" mechanism of the standard drilling rig is sufficient to push the casing into place, from the top until the bottom edge 32 of the casing 30 penetrates a short way into unagitated, impervious clay 16 to provide sealing engagement in the clay. The structural casing 30 is shown in place in FIG. 2. If the impervious stratum below is rock, teeth may be formed on the lower end of the casing and the casing can then be rotated and ground into sealing engagement with the rock.

The wall thickness of casing 30 will depend upon the length of the casing and ground conditions. Normally, at least a ½" steel casing will be used. The casing has to be of sufficient length to reach the impervious foundation, and the top of the casing will usually be at ground level or above; in one project the casings used were about 20 feet in length. The diameter of the casing is usually about two feet larger than the desired diameter of the finished caisson.

After the structural casing 30 is pushed into a sealing engagement with the impervious material, at about 18 feet below the surface, the column of suspended material within the casing is then removed by any convenient, known manner to produce a water-free and material-free shaft.

The thixotropic material outside of the casing 30 will settle out of suspension and form a relatively solid and impervious open-ended cylindrical layer or shell 22'.

It should be understood that while the placing of an upper casing 30 is often desirable, the invention herein is not limited as to the means or method of placing the casing 30 in position. Shafts and caissons, according to the invention, may be formed with or without a casing such as 30.

After the material within casing 30 is removed, a shaft 34 of approximately nine feet in diameter is drilled downwardly from the upper shaft 33 such as by a bit 28' continuing downwardly through the earth's strata until bedrock 120 having sufficient bearing strength is reached. In one project, in which the method of the invention is utilized, the depth of the shafts 34 were drilled to a depth of about 150 feet.

As the shaft 34 is dug, water is present or poured into the shaft to maintain the water level at a suitable depth below the surface, say 30 feet, as indicated by the dotted line 20", see FIG. 3. The column of water and the weight force which it exerts against the sides of the shaft prevents cave-in problems. As the shaft 34 is dug through the earth strata, and as mentioned above, underground sources of water indicated by dotted line 20' may be tapped which will cause water to flow freely into the shaft and no extra water need be poured into the shaft. The drilling of the shaft 34 is continued in such a water environment until the shaft reaches the desired depth.

A core barrel 40 which, as mentioned above, is usually an open-ended cylindrical form about a foot in diameter less than the shaft 34 is raised and lowered into the shaft. As mentioned, the core barrels used in one project were eight feet in diameter, of ¾" steel plate, 120 feet in length, and weighed approximately 60 tons. Teeth 41 are formed on the bottom edge thereof to enable the core barrel 40 to penetrate the bedrock, as will be described.

When the core barrel 40 is placed in the shaft 34, the water level 20' within the shaft does not change substantially. Additional water may be poured into the shaft 34 to raise the water level 20' in the shaft, for purposes to be described. It should be understood that the water or fluid in the shaft may range from almost pure water to mud, sludge and other suspended material; the apparatus and method of the invention will function satisfactorily in all such environment.

Next, a flotation tank 35 is hoisted into place inside of the core barrel 40, see FIG. 3. The flotation tank 35 is a water-tight tank arranged with air input and exhaust means indicated schematically by a hose 37, and water input and exhaust means indicated schematically by hose 39. Suitable valve means for the hoses 37 and 39 are indicated at 37', 37" and 39', 39", respectively. The valves are utilized, by known means, to control the input and output of the water and air through the respective hoses.

Water may be introduced into the tank by pumping water in through the hose 39 from a source on the surface, not shown. Alternatively, if the water in the shaft 34 is of sufficient depth a check valve, not shown, of any suitable known type may be provided at the lower end of the tank 35 to admit water from the shaft 34 into the tank 35. In either case, sufficient water is introduced into the tank 35 such that a major portion of the tank is immersed in the water.

Also, as mentioned above, the water level, indicated in FIG. 3 at 20", in the shaft 34 may be varied by adding water into the shaft from sources on the surface, and the relative position of the flotation tank 35 in the core barrel 40 can thus be adjusted. In the project being described, the tank is positioned such that sufficient water is introduced into the tank so that the upper end of the tank is approximately at the level of the top of the core barrel 40 and about one foot above the water level 20". The tank 35 is affixed to the interior of the core barrel 40 such as by clamps or ear flanges 43 which are welded onto the side of tank 35 and to the inside of the core barrel 40. Any other suitable means for firmly attaching the flotation tank 35 to the core barrel 40 may be employed.

For certain applications, it has been found that the tank 35 may be conveniently affixed inside the core barrel 40 before the core barrel is hoisted into the shaft 34.

In order to effectively reduce the large weight of the core barrel, which as mentioned is about 60 tons, air under pressure is fed through the air control hose 37 into the flotation tank 35 and as the air enters the tank it displaces water. As is known, as the water is displaced, the tank 35 becomes buoyant, supported by the water in the shaft 34 and, since the tank is attached to the core barrel 40, a lifting or buoyant force will be provided to the core barrel. Accordingly, the effective weight of the core barrel 40 is reduced to a weight which the associated drilling rig can handle and rotate.

In one embodiment of the invention, the weight of water displaced from the flotation tank 35 is approximately 40 tons. The total weight of the core barrel, 60 tons, is thus reduced by 40 tons, or, in other words, the weight which the drilling rig must rotate is about 20 tons. Thus, the water in the shaft "carries" 40 tons of the weight of the core barrel 20.

Next, a drilling auger of any suitable known type, not shown, is attached to the top 42 of the core barrel 40 such as to the suitable recesses 49, and the core barrel is rotated to cut a kerf in the bedrock so that the core barrel is embedded or rotated approximately five to ten feet into the bedrock, indicated at point 45, as shown in FIG. 4. As will be appreciated, the amount of effective weight on the core barrel 40, and hence the bite of the teeth 41 formed on the bottom of the core barrel, can be controlled by controlling the amount of water displaced from the flotation tank 35; that is, the buoyant force which, in turn, is controlled by controlling the air introduced into the flotation tank 35.

As shown in the enlarged drawing of FIG. 6, the teeth 41 are each made of an inner layer 41" and an outer layer 41' of metal. The inner layer 41" is of a carborundum steel which is very hard and an excellent cutting medium. However, carborundum steel is brittle, and is susceptable to damage such as by impact during the handling of the core barrel 40 and the hoisting of the core barrel into the shaft 34. The outer layer 41' is of a relatively less hard metal, but metal which will wear relaitvely fast. This outer layer 41' protects and cushions the inner layer 41" of carborundum steel. When the rotation of the core barrel 40 is initiated to embed the core barrel into the bedrock, the outer layer 41' will wear away relatively fast and expose the inner carborundum steel layer 41" which continues to cut into or "bite" into the bedrock to embed the core barrel 40 therein.

As mentioned above, the effective weight of the core barrel 40 can be varied by controlling the air introduced into the tank 35 to displace the appropriate amount of water from the tank. Note, of course, that the water may be displaced from the tank by directly pumping the water out by suitable pumps, as is well known in the art. Accordingly, the "bite" of the teeth 41 into the bedrock can be adjusted as desired. While we have described embedding the core barrel in bedrock, it will be appreciated that the core barrel could be rotated into other types of earth strata and the principal of controlling its weight by buoyancy would be equally important.

After the core barrel is embedded approximately eight feet in bedrock 120, as indicated in FIG. 4, the flotation tank is detached from the casing and hoisted out of the core barrel. Then the water and rock within the core barrel 40 are removed either manually or by any other suitable known means. Removal of bedrock which is within the core barrel 40 is desirable to assure that the concrete, to be poured, bonds and seals solidly to the bedrock.

In forming some caissons it may be desirable to remove or pull the core barrel from the shaft; and, in this case, concrete will be poured into the lower portion of the core barrel. The core barrel is slowly raised concurrently as the level of the concrete being poured rises in the shaft. The lower end of the core barrel is maintained below the level of concrete in the core barrel so that surrounding earth is not pushed into the concrete filling the shaft. In other instances the entire core barrel may be left in place and filled entirely with concrete (and in certain applications re-enforcing steel is used) to complete the caisson.

Since core barrels are very expensive, in a number of cases a portion of the core barrel is removed. In FIGS. 4 and 5, we have illustrated a situation where the upper portion of the core barrel is to be salvaged for reuse. Note that the water in the ground surrounding the caisson is to be shut out so that as the concrete sets it is not in contact with this water. The concrete is poured into the core barrel by any suitable free-fall means to a level above the water level 20' which is usually artesian water; and, next the grouting material 46, of any suitable known type, is poured th rough siutable hose means, indicated schematically as 47, into the space between the outside of the core barrel 40 and the shaft 34 to a level about six feet above the water level 20' to seal off the shaft 34 and the core barrel 40 from said water source. Note that the source of water in the upper shaft 33, indicated at 20, has previously been sealed off by the shell of layer 22' of thixotropic material.

After the grouting material 46 has hardened, the core barrel is cut as indiacted at 50 such as by a cutting torch at a level of about eight feet above the water level 20'. The pouring of concrete into the core barrel is continued to a height about 30 to 40 feet (in one project) above the cut 50, then the severed upper portion of the core barrel is slowly hoisted out. As the core barrel 40 is being hoisted out, more concrete is poured into the core barrel, and the concrete forces outwardly from the bottom of the severed portion of the core barrel and fills in the shaft 34 as shown in FIG. 5 to form the upper portion 52' of the caisson 52. As much as 80 feet of the core barrel has often been salvaged.

Note that the upper portion 52' of the caisson will be of the same diameter as the shaft 34 while the diameter of the lower portion of the caisson 52 will be of a diameter determined by the core barrel 40. Concrete is poured until the level of the concrete rises to the final desired height which is shown by way of example in FIG. 5 to be about the level of the lower edge of the casing 30. Since ground water has been excluded from shaft 34 the concrete can set without being immersed in water. Thus, a caisson 52 has been formed having suitable anchoring bolts 51 embedded on the top of the caisson. The final step of the method of the invention is to pull the structural casing 30 out of the shaft also to be used elsewhere. The caisson 52 is then ready to function as a building foundation.

Another embodiment of the invention is disclosed in FIG. 7 wherein a flotation tank 135 has an open upper end. Note that the flotation tank 135 is similar, generally, to flotation tank 35 of FIG. 3 with the exception that flotation tank 135 of FIG. 7 has an open upper end; that is, it is not closed at its upper end. The flotation tank 135 may be attached to the core barrel 40 by suitable brackets 143 similarly as the flotation tank 35 of FIG. 3 is attached to core barrel 40. Suitable hoses 137 and valve means 138 are provided for introducing water into, and removing water from, the flotation tank 135, for purposes to be described.

In this embodiment of the invention the flotation tank 135 may be lowered to a position within the core barrel 40 wherein the bottom of the tank 135 is resting on the water level 20". Next, the flotation tank is caused to be lowered into the water by pumping water through said hoses 137 into the flotation tank 135 and letting the weight of the water in the tank settle the tank into the water. The tank is thus lowered to a selected position such as to have a major portion of the tank beneath the water level 20', and the tank 135 is then attached to core barrel 40 by the brackets 143.

An alternative method of positioning the tank 135 in the core barrel 40 is to attach the tank 135 to the core barrel before the core barrel is placed in the shaft. As the core barrel 40 is positioned in the shaft, water may be pumped into the tank 135 as necessary to control the effective weight, and hence the lowering of the core barrel in the shaft.

In order to effectively reduce the weight of the core barrel 40, the water previously pumped into the flotation tank 135 is next pumped out. As is known, as the water is removed from the tank 135, a buoyant force is provided to the tank by the surrounding water; that is, the water in the core barrel 40. Since the tank 135 is attached to the core barrel 40 (and the core barrel has an open bottom), a lifting or buoyant force will thus be provided to the core barrel.

Another embodiment of the invention is shown in FIG. 8 wherein a flotation tank 235, similar to tank 135, is employed. However, in the embodiment of FIG. 8, the open end of the tank 235 is inverted relative to the tank 135 of FIG. 7; and, the open end of the tank is the lowermost portion of the tank inserted into the core barrel 40. In this embodiment of the invention, the tank 235 may conveniently be inserted within the core barrel to the desired position merely by lowering the tank 235 and locating it in the position desired. The tank is then attached as by brackets 243 to the core barrel 40, similarly as brackets 143 attached tank 135 to core barrel 40 in FIG. 7.

Also, as mentioned with respect to tanks 35 and 135, the tank 235 may be attached to the core barrel 40 before the core barrel is placed in the shaft.

The flotation tank 235 includes suitable valve means 239 and hose means 240 for the introduction of air under pressure into the flotation tank 235 and expelling air from the tank 235. As air is introduced into the flotation tank an air pocket is created within the tank 235 which effects a buoyant or lifting force on the tank. The amount of buoyant force on the tank 235 can be controlled by the air introduced into the flotation tank 235. Since the tank is attached to the core barrel (and since the core barrel has an open bottom), a lifting force will be provided to the core barrel 40 which effectively reduces the weight thereof.

FIG. 9 shows still another embodiment of the invention which has been found to be preferable for certain applications. In FIG. 9, a water and air-tight cover plate or cap 56 is affixed to the end or to an intermediate portion of the core barrel 40 to selectively close or cover the core barrel 40 as will be explained hereinbelow. The same core barrel 40 may be utilized in both of the embodiments of the invention disclosed herein.

The valve cover 56 which is of approximately the same diameter as core barrel 40 weighs about a ton and is formed of ¾" thick steel. In view of the size and weight of the cover 56 special means are provided for positioning the cover in the core barrel as follows. Mounting brackets 57 are affixed to the interior of the core barrel 40 at spaced points on its periphery, see also FIG. 10. A flat ring 58 is positioned in core barrel 40 and welded along the interior periphery of the core barrel and to the brackets 57 to provide a solid air and water-tight fitting. The cover 56 includes valve means 60 of any suitable known type arranged to permit air under pressure to be selectively introduced into, and expelled out of, the core barrel 40. Cover 56 also includes valve means 70, see FIGS. 10 and 11, of any suitable known type arranged to permit water to be introduced or removed from the core barrel 40. For removing water from the core barrel suitable hoses or pipes, not shown, may be positioned within and outside of the core barrel and connected to the valve means 70.

The cover 56, which is shown in more detail in FIG. 10, includes a recessed portion 61 at its center. A pivot rod 62 is transversely mounted in portion 61 and is substantially parallel to the plane of the cover 56. The pivot rod 62 is attached to a lifting rod 63 positioned perpendicularly to pivot 62, and rod 63 is, in turn, telescoped within shaft 64. Rod 63 and shaft 64 are connected to the drilling and hoisting rig by suitable known means, not shown. When the rod 63 is pulled upward (or to the right as oriented in FIG. 10), the end of the shaft 64 abuts against and pushes cover 56 into a position substantially perpendicular to the axis of the core barrel 40. The lifting unit; that is, both rod 63 and shaft 64 are then raised (moved to the right as oriented in FIG. 10) until the periphery of the cover 56 abuts against the ring 58, as indicated by the dotted lines in FIG. 10. A suitable neoprene gasket 65 is positioned on the periphery of cover 56 and arranged to abut against the under surface of the ring 58 for providing an air-tight seal therewith. It will be appreciated that as the air pressure within the core barrel 40 is increased, the air will push up aganst the under surface of the cover 56 which will make for an even tighter seal or the gasket 65 on ring 58 with the cover 56.

As shown in FIG. 11, the cover 56 is circular in shape with two opposing segments of the circular shape being cut-off as indicated by the dotted lines 66A and 66B. The size of the cover 56, indicated by dotted lines in FIG. 11, is a few inches larger around its periphery than the similarly shaped opening 58a of the ring 58. To insert or withdraw the cover 56 from within the core barrel, the cover 56 is tilted as shown in FIG. 10, and the shaft 64 and rod 63 are rotated such that the cover 56 is rotated approximately 90 degrees from the position shown in FIG. 11. In the 90-degree rotated position, the narrow dimension of cover 56, measured from line 66A to line 66B of FIG. 11, is inserted in a tilted position, as shown in FIG. 10, through the widest part of the opening in ring 58, as measured between lines 67A and 67B in FIG. 11. Once the cover 56 is moved past the opening of ring 58, the cover 56 may be again rotated such that the narrow dimension of the cover 56 underlies the narrow dimensions of the opening of ring 58, as is shown in FIG. 11. Next, the cover 56 is returned from the tilted position to a position substantially perpendicular to the axis of the core barrel 40 by operating rod 63 and shaft 64 as described above; and the cover is then abutted against the ring 58.

The cover plate 56 may then the affixed to the ring 58 by suitable L-shaped brackets 68 as indicated schematically in FIG. 11a. The L-shaped brackets may be attached to the cover 56 by suitable bolts or screws 69 threaded into holes which are formed in the cover. The screw holes are not extended entirely through the cover 56 and thereby retain the air and water seal or integrity of cover 56. One end of each bracket 68 rests on the upper surface of ring 58 and the other or the inverted L-portion of the bracket rests on the cover 56. When the bolts 69 are tightened, the brackets 68 draw the cover 56 and the neoprene gaskets 65 tightly against the under side of the ring 58 to thereby provide a water and air-tight seal.

The overall operation of the embodiment of the invention as shown in FIGS. 9, 10 and 11 is substantially similar to that of the embodiment of the invention shown in FIGS. 3–5. However, in the embodiment of FIG. 9, the core barrel 40 itself is the air receiving and retaining body instead of the flotation tank 35. After the cover 56 is positioned within the core barrel 40, as described above, air is pumped through the associated hose valve 60 into the core barrel. The air pressure forcing against the water, mud and other material, within the core barrel provides an upward force to the cover 56. Since the cover 56 is sealed to and bears on ring 58 which, in turn, is affixed to core barrel 40, the foregoing upward force will tend to raise the core barrel and hence will effectively reduce the weight of the core barrel for purposes discussed hereinabove.

Also, for some applications, it has been found desirable to introduce air under pressure into the core barrel for purposes of raising the core barrel and/or for assisting in hoisting the core barrel out of its shaft. Further, when the core barrel 40 is being rotated to embed the core barrel in the supporting strata, the teeth 41 of the core barrel, see FIG. 6, become dirty, gummed or clogged which reduces the effectiveness of the teeth. It has been found that air under selective pressure forced into the core barrel 40 will cause a flow of water from the interior of the core barrel, under the toothed end of the core barrel and to the outside of the core barrel. The foregoing action is effective to clean the teeth 41 to maintain their cutting effectiveness.

It should be emphasized that while the invention has been described and shown in the various drawings in connection with a particular project wherein an upper structural casing 30, and a method of forming the upper shaft 33, as described in the above-noted Patent 3,100,381, are employed; this present invention is not limited to such application. The present invention including the means and methods of operating and working with a core barrel are generally applicable in the forming of all types of shafts, and particularly shafts which are to be of relatively large depths.

The present invention has also been found to be useful in applications wherein a shaft is to be drilled in, say, for example, the bed of a river or through unstable ground. Assume, the embodiment of the invention shown in FIGS. 9, 10 and 11 is employed in a project wherein a shaft is to be drilled in the bed of a river, the core barrel 40 is lowered through the water and the river bed until the end of core barrel 40 rests on supporting strata. The drilling rig may then rotate the core barrel 40 to embed the core barrel in the supporting strata. The amount of bite of the teeth 41 on the core barrel 40 can be controlled, as mentioned above, by introducing air under pressure through the valve 60 on cover plate 56 into the core barrel. If desired, the material within the core barrel 40 can then be removed and concrete or other suitable material poured within the core barrel 40. The core barrel 40 may be raised out of the shaft, such as by utilizing a hoisting rig and assisting in forcing the core barrel upward by introducing more air under pressure into the core barrel 40, as described above. Alternatively, the core barrel 40 may be left in position, or a portion of the core barrel left in position, and the upper portion cut off and removed, as also explained hereinabove.

Thus, the various embodiments of the invention disclose a method and means for providing a buoying or lifting force to a core barrel positioned in a shaft to control the effective weight of said core barrel to enable the controlled manipulation of the core barrel by associated machinery, or to provide a lifting force to tend to lift or move the core barrel out of the shaft.

While the invention has been particularly shown and described with reference to preferred embodiments thereof, it will be understood by those skilled in the art that various changes in form and details may be made therein without departing from the spirit and scope of the invention.

We claim:

1. A method for producing hollow shaft linings in a substrate, comprising the steps of: forming an elongated hollow shaft in the substrate, accumulating liquid in the elongated hollow shaft in the substrate, accumulating liquid in the elongated hollow shaft, introducing a rotatable hollow cylindrical core barrel into the hollow shaft and into frictional contact with the substrate surface bordering the bottom of the shaft, the liquid in the hollow shaft filling a portion of the hollow cylindrical core barrel, and connecting buoying means to the core barrel to buoy the core barrel in the fluid in the hollow shaft and to facilitate the operation of the hollow cylindrical core barrel.

2. A method as in claim 1 wherein water is the liquid present in said elongated hollow shaft and in said core barrel further, including the steps of, affixing a tank within said core barrel; and, controlling the buoyancy of said tank by selectively introducing and removing water from said tank to thereby control the effective weight of said core barrel.

3. The method of claim 1 wherein water is the liquid present in the shaft and the buoying means includes a flotation tank having water input and output means, comprising the step of connecting the flotation tank within said core barrel; introducing water into said tank such that a substantial portion of said tank is below the water surface level; and displacing water from said tank whereby said tank tends to float and effects a buoyant lifting force on said core barrel to decrease the effective weight of said core barrel resting on the shaft substrate.

4. The method of claim 3, further including the step of forcing air under pressure into said tank to displace the water therein whereby said tank tends to float and effects a lifting force on said core barrel to decrease the effective weight of said core barrel.

5. The method of claim 1 for producing shaft linings in a substrate including the step of controlling the buoyancy of the buoying means connected to the core barrel by air under pressure.

6. An apparatus for forming hollow shaft linings in a substrate in the presence of water comprising, in combination, an axially elongated core barrel insertable into a hollow shaft, flotation means mounted to said core barrel to provide a flotation chamber therein to produce the selective buoying thereof, means for introducing water into the flotation chamber, means for expelling water from said flotation chamber to effect the selective buoying of the core barrel, means for controlling the introduction and expulsion of water from said flotation chamber, and connecting means for connecting the core barrel to a prime mover for producing the rotation of the core barrel in frictional engagement with a substrate.

7. An apparatus for forming hollow shaft linings in a substrate in the presence of water comprising in combination a core barrel insertable into a hollow shaft, a flotation tank, means for mounting said flotation tank within said core barrel, means for introducing water into the flotation tank, means for controlling the introduction of water into said flotation tank, means for expelling water from said flotation tank to effect a buoying of said flotation tank with a corresponding lifting of said core barrel connected thereto, and means for controlling the expulsion of water from said flotation tank, and connecting means for connecting the core barrel to a prime mover for producing the rotation of said core barrel in frictional engagement with a substrate.

References Cited

UNITED STATES PATENTS

| 57,784 | 9/1866 | Smith | 61—40 |
| 2,021,014 | 11/1935 | Moran | 61—81 |
| 3,293,865 | 12/1966 | Loofbourow et al. | 61—41 |
| 3,295,327 | 1/1967 | Waterman | 61—41 X |
| 2,089,041 | 8/1937 | Smith | 61—63 |
| 3,185,226 | 5/1965 | Robbins | 175—102 |

FOREIGN PATENTS

| 619,171 | 12/1926 | France. |
| 720,986 | 12/1954 | Great Britain. |
| 286,333 | 8/1915 | Germany. |

JACOB SHAPIRO, Primary Examiner.

U.S. Cl. X.R.

61—53.64, 63, 67; 166—46; 175—102, 177

U.S. DEPARTMENT OF COMMERCE

PATENT OFFICE

Washington, D.C. 20231

UNITED STATES PATENT OFFICE
CERTIFICATE OF CORRECTION

Patent No. 3,436,921                                                         April 8, 19( Grover C. Gauntt, Jr., et al.

It is certified that error appears in the above identified patent and that said Letters Patent are hereby corrected as shown below:

Column 2, line 63, after "reference" insert -- characters --. Column 6 line 69, "susceptable" should read -- susceptible --. Column 7, line 48, cancel "th rough siutable" and insert -- through suitable --; line 57, "indiacted" should read -- indicated --. Column 9, line 52, "or" should rea -- of --.

Signed and sealed this 14th day of April 1970.

(SEAL)
Attest:

Edward M. Fletcher, Jr.                              WILLIAM E. SCHUYLER, JR.
Attesting Officer                                          Commissioner of Patents